July 27, 1965   E. V. BERGSTROM   3,197,293
HIGH TEMPERATURE CONVERSION PROCESS AND APPARATUS
Filed May 14, 1962
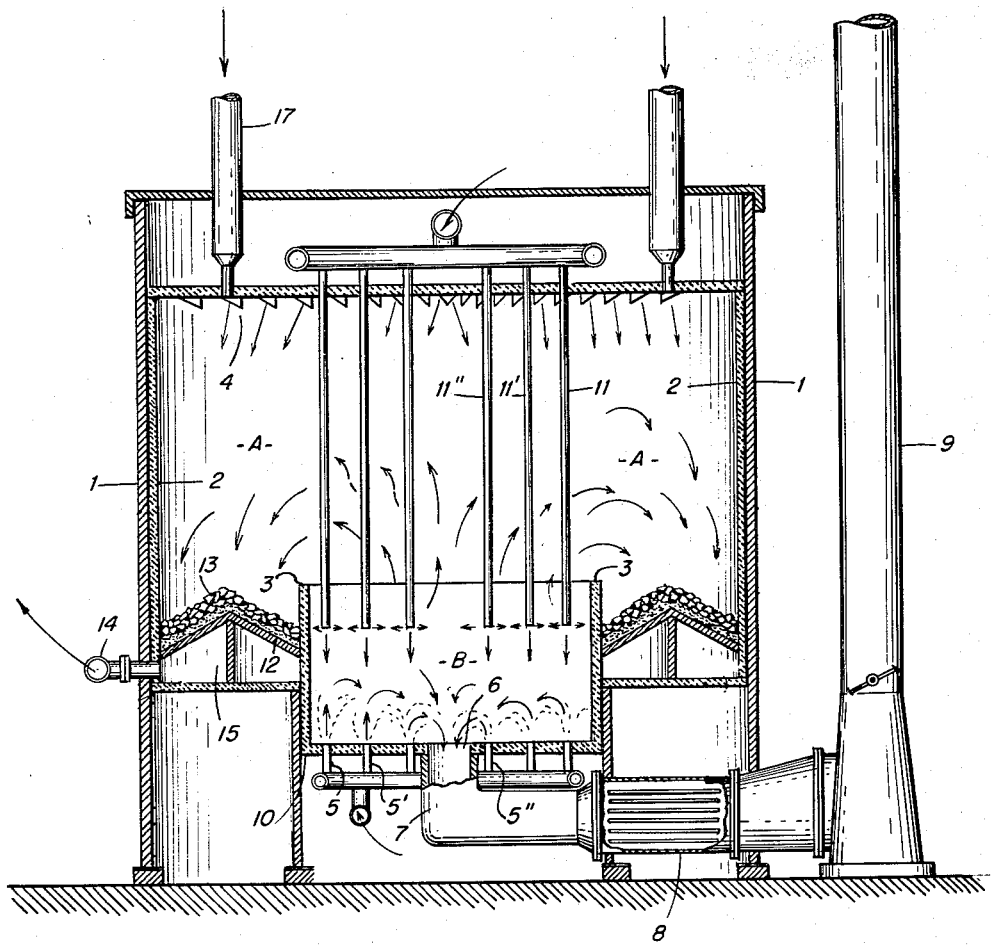
INVENTOR.
Eric V. Bergstrom

United States Patent Office 3,197,293
Patented July 27, 1965

3,197,293
HIGH TEMPERATURE CONVERSION
PROCESS AND APPARATUS
Eric V. Bergstrom, Byram, Conn., assignor to Socony
Mobil Oil Company, Inc., a corporation of New York
Filed May 14, 1962, Ser. No. 194,505
11 Claims. (Cl. 48—206)

The present invention relates to a novel process, and apparatus useful therefor, for carrying out relatively high temperature reactions and, for example, reactions that require a temperature of from about 1400° F. to about 3000° F. More particularly, the invention relates to such a process carried out in an integral heater-reactor in which the desired reaction is carried out in contact with a bed of particulate solids maintained at desired reaction temperatures by radiant heat from a suitable fuel, combusted in said heater-reactor, with minimization or obviation of contamination of the desired reaction products by the flue gas.

In accordance with this invention, the process is carried out in a suitable vessel partitioned to form a reaction chamber and a combustion chamber with the two chambers being in open communication at one end of the partition that separates such chambers. In the combustion chamber, a suitable fuel is burned while there is maintained, over the burning fuel and resulting flue gas, a gas of lower density than the flue gas and which is essentially transparent to radiant heat and, depending on the particular reaction to be carried out, may be a reactant or an inert gas. By such use of a gas of lower density, the flue gas resulting from burning of the fuel is maintained (by a blanket of the less dense gas) in a combustion zone below the top of the partition and, by appropriate discharge means in the combustion chamber, the flue gas is withdrawn therefrom. Thus, the less dense gas blankets not only the flue gas but also the reaction zone, and the flue gas is prevented from passage in substantial amount into the reaction chamber. By radiation of heat from the burning fuel to a wall surface which confines the less dense gas thus blanketing both the combustion and the reaction chambers, and by re-radiation of such heat from said wall surface to a bed of particulate solids in the reaction zone, in said reaction chamber, the bed of solids are maintained at the desired reaction temperature. The material to be reacted is charged into contact with the bed of solids and the products of the reaction are withdrawn from the reaction chamber without substantial contamination from the flue gas utilized in heating the bed of solids by radiation.

Broadly, the present invention comprises a process for carrying out high temperature reactions in a closed vessel partially partitioned internally in a substantially vertical direction to provide a combustion zone in communication with a reaction zone through an open communication zone in the upper portion of said vessel which includes the continuous steps of radiating heat to a ceiling of said vessel by burning fuel in said combustion zone substantially below the level of said communication zone, withdrawing the resulting flue gas from the lower portion of said combustion zone, introducing a gas transparent to radiant heat and less dense than said flue gas at a level above said combustion zone and below said communication zone to prevent substantial diffusion of said flue gas into said reaction zone, reradiating heat from said ceiling to a bed of particulate solids in said reaction zone to maintain said bed at reaction temperature, contacting said heated bed of solids with a gaseous reactant and withdrawing a gaseous product stream from said reaction zone. The invention also includes apparatus especially suited for the aforesaid process.

Narrower aspects of the invention relate to such features as selecting either an inert gas or a gaseous reactant as the less dense gas, selecting either an inert material or a catalytic material as the bed of particulate solids, a specific embodiment of the invention wherein stream as the less dense gaseous agent is also a reactant which reacts with carbonaceous particulate solids as well as details of various apparatus elements.

Other features, benefits and advantages of the invention will be apparent to those skilled in the art upon consideration of the detailed disclosure hereinafter.

In reference to apparatus of the integral heater-reactor type as embodied herein, such apparatus comprises, in an illustrative embodiment, and enclosed vessel that internally is vertically partitioned to form a reaction chamber and a combustion chamber with the partition being short of the ceiling of said vessel whereby the two chambers are in open communication in between said ceiling and the top of said partition; means for introducing a suitable fuel into the buttom portion of said combustion chamber and means for discharging, from the bottom portion of said combustion chamber, flue gas resulting from burning of said fuel in said combustion chamber; means for introducing into the upper portion of said combustion chamber, but below the upper edge of said partition, a gas of lower density than said flue gas whereby said gas of lower density blankets the flue gas which is then discharged via the flue gas discharge means in the bottom portion of the combustion chamber and said gas of lower density also blankets the reaction zone due to the reaction chamber and the combustion chamber being in open communication in the space above the partition; perforate means disposed in said reaction chamber adapted to support a bed of particulate solids; means means for charging onto said bed a material that is to be reacted; and means for withdrawing the products of reaction of said material from said reaction chamber.

In order that the invention can be understood more fully, it is described hereinafter in connection with the accompanying drawing in which the figure is a vertical, central section of a diagrammatic nature of an embodiment of an integral heater-reactor suitable for the practice of the present invention.

In the drawing, there is shown a cylindrical vessel 1, inner-lined with refractory 2, partitioned by a cylindrical, coaxially disposed partition 3 of such vertical dimension that the partition terminates short of ceiling 4 to form a reaction annulus A and a combustion chamber B which is in open communication with annulus A in between ceiling 4 and the partition 3. Extending through the bottom wall 10 of the combustion chamber are a multiplicity of conduits 5, 5′, 5″, etc. for passing a suitable fuel into the combustion zone and, also in the bottom wall 10 of combustion chamber B, an opening 6 is provided that is in open communication with flue gas discharge conduit 7, waste heat boiler 8 and stack 9. Extending through ceiling 4 and downward to an edge intermediate the upper elevation of partition 3 and floor 10 of the combustion chamber is a plurality of gas feed conduits 11, 11′, 11″ etc. served by a common manifold for passing a suitable gas into the combustion chamber B. In the reaction annulus A, there is shown a perforated support 12 for supporting a bed of particulate solids 13 and feed conduits 17 thereabove and, extending through ceiling 4 for feeding to said solids 13 a material to be reacted by contact with the bed of solids and, for discharge of reaction products that pass downwardly through said bed and perforated support 12, a discharge conduit 14 for discharge of reaction products from the chamber via cooling chamber 15.

In operation, using such an embodiment of the apparatus, a suitable fuel (e.g., fuel gas) is passed via conduits 5, 5″, 5‴, etc. into the bottom portion of combustion chamber B and is burned therein while simultaneously, a suitable gas, of lower density than the flue gas and transparent to radiant heat, is passed through conduits 11, 11′, etc. By virtue of differences in density, the less dense gas exiting from the terminal portion of conduits 11, 11′ and 11″ forms a blanketing or boundary layer in the combustion chamber B above the heavier flue gas which is removed via conduit 7, thereby preventing substantial diffusion of the flue gas into the layer of less dense gas. Further, the less dense gas blankets the reaction annulus A as a result of partition 3 terminating short of ceiling 4. Heat that radiates from the layer of burning fuel in the lower portion of combustion chamber B to ceiling 4 reradiates therefrom to the bed of solids 13 supported by support 12 in the reaction zone in annulus A thereby maintaining the bed at a suitable elevated temperature for producing the desired reaction products which are discharged via conduit 14 without substantial, if any, contamination with the flue gas from the combustion zone in chamber B. For reradiating the radiant heat into the reaction annulus A, roof 4 is preferably provided with roof tile of such configuration and position to so reradiate the heat in that direction.

In an illustrative embodiment, using an apparatus as shown in the accompanying drawing, for production of synthesis gas ($H_2+CO$), the gas of lower density introduced via conduits 11, 11′, etc. is steam (i.e., a reactant) for reaction with a bed of coke 13 maintained by feeding coke via feed conduit 17 onto the bed that is in contact with the steam, while the fuel passed into the combustion chamber B can be any of a variety of fuels, including liquid hydrocarbon fuels, gaseous fuels such as propane, refinery gas, etc. In a specific embodiment for production of such a synthesis gas, fuel gas or fuel oil is fed via conduits 5, 5′, 5″, etc. and is burned in combustion chamber B in the presence of air from a conventional source (not shown) to produce a temperature of about 2400° F. while, simultaneously, steam at a temperature such as to maintain the blanket of steam at a temperature of about 2000° F. is fed via conduits 11, 11′, 11″, etc. At such temperatures, the flue gas in combustion chamber B has a density of 0.0138#/cu. ft. and the steam has a density of 0.008#/cu. ft., whereby the steam blankets the flue gas and prevents substantial diffusion of the flue gas into the steam blanket, and the flue gas is discharged via conduit 7. With coke being fed via conduits 17 to fall by gravity onto bed 13 at the rate of 31,500 lbs./hr., the bed of coke 13 is maintained at from about 1600° F. to about 1800° F. by the sequence of heat radiation from combustion chamber B to the ceiling 4 and reradiation to the coke bed 13. By reaction of the coke with the steam, in accordance with the reaction $$C+H_2O \rightarrow H_2+CO-51{,}000 \text{ B.t.u./mol}$$

there is produced a synthesis gas comprising about 1,000,000 cu. ft. each (per hour) of CO and $H_2$ that is discharged via conduit 14 substantially devoid of contamination with flue gas from combustion chamber B. For such an embodiment, the heat balance is as follows:

|  | B.t.u./hr. |
|---|---|
| Heat of reaction | ~134,000,000 |
| Sensible heat to 1700° F. | ~59,000,000 |
| Heat to process | ~193,000,000 |
| Heat liberated at burners, 482,000,000 B.t.u./hr. @ 40% efficiency | ~192,800,000 |

Although the invention has been described with particular emphasis, for purposes of illustration and not limitation, for production of synthesis gas (CO+$H_2$), it is useful for carrying out many other types of high temperature reactions. Examples of such other reactions include the following which, for purposes of illustration, are described in connection with an apparatus as shown in the accompanying drawing:

(1) Thermal cracking of liquid hydrocarbons in which case a bed of particulates, inert solids (e.g., pebbles) is supported on a perforated support in the reaction annulus A, the liquid hydrocarbon to be cracked is fed via conduit 17, the bed of solids is maintained at cracking temperatures (e.g. 1700° F.) by radiant heat as aforedescribed, and the blanketing gas (less dense than the flue gas in combustion chamber B) can be steam or another inert gas, such as flue gas, nitrogen, eac.;

(2) Catalytic cracking of liquid hydrocarbons, such as a gas oil, carried out similar to (1) but in which the bed of solids comprises a cracking catalyst, e.g., bead catalyst, maintained at a temperature of about 900° F.;

(3) Pyrolysis of gaseous hydrocarbons (feed stocks that may vary from propane to gas oil) for production of ethylene, acetylene, carried out similar to 1 but in which, preferably, the feed conduit 17 terminates closer to the bed of solids (inert or catalytic) than in the case of feeding solids (coke) and heavier stocks (e.g., residual oils); and (4) Dehydrogenation of butane to butadiene by feeding onto a bed of catalyst or inert pebbles maintained at 1400–1500° F.

In the practice of the invention, and for reactions other than those for which steam is an essential reactant as in the production of synthetic gas, steam is a particularly preferred medium for use as the gas of lower density than the flue gas. However, when reactions are carried out in which the less dense gas can be an inert gas and is not an objectionable substance in admixture with the reaction products, other gases normally of lower density than gases from conventional hydrocarbon fuels can be used and examples of such other gases include flue gas, nitrogen, $CO_2$, etc.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for carrying out high temperature reactions in a closed vessel partially partitioned internally in a substantially vertical direction to provide a combustion zone in communication with a reaction zone through an open communication zone in the upper portion of said vessel which comprises the continuous steps of radiating heat to a ceiling of said vessel by burning fuel in said combustion zone substantially below the level of said communication zone, withdrawing the resulting flue gas from the lower portion of said combustion zone, introducing a gas transparent to radiant heat and less dense than said flue gas at a level above said combustion zone and below said communication zone to prevent substantial diffusion of said flue gas into said reaction zone; reradiating heat from said ceiling to a bed of particulate solids in said reaction zone to maintain said bed at reaction temperature, contacting said heated bed of solids with a gaseous reactant and withdrawing a gaseous product stream from said reaction zone.

2. A process according to claim 1 in which at least a portion of said less dense gas reacts with said particulate solids.

3. A process according to claim 1 in which the said bed of particulate solids comprises an inert material for the thermal conversion of said gaseous reactant, and said less dense gas is an inert gas.

4. A process according to claim 1 in which said bed of particulate solids comprises a catalyst for the catalytic conversion of said gaseous reactant, and said less dense gas is an inert gas.

5. A process according to claim 1 in which said less dense gas is steam, said particulate solids are a carbonaceous material, said bed of solids is maintained at a temperature sufficient for said carbonaceous material to react with said steam to produce a mixture of carbon monoxide and hydrogen as said gaseous product stream.

6. A process according to claim 5 in which said steam is introduced above the combustion zone at a temperature sufficient to maintain a blanket of steam at about 2000° F., the temperature of the burning fuel in said combustion zone is about 2400° F. and the bed of carbonaceous solids is maintained at from about 1600 to 1800° F.

7. A process according to claim 6 in which said carbonaceous material is coke.

8. An integral heater-reactor suitable for high temperature reactions comprising a closed vessel, a combustion chamber and a reaction chamber therein separated by a partition substantially vertically disposed in said vessel and terminating below the ceiling thereof to provide open communication between said chambers, means providing combustion within said combustion chamber in a combustion zone located substantially below the top of said partition, means for discharging the resulting flue gas from a lower portion of said combustion chamber, support means disposed in said reaction chamber at a level below the top of said partition and adapted to support a bed of particulate solids to be maintained at reaction temperature, means for introducing a gas transparent to radiant heat and less dense than said flue gas at a level in said combustion chamber between the top of said partition and said combustion zone whereby said less dense gas blankets the combustion zone and substantially prevents diffusion of said flue gas into said reaction chamber, and means for discharging reaction products from said reaction chamber, said integral heater-reactor being adapted to maintain said bed of solids at reaction temperature by radiation of heat from said combustion zone to said ceiling and reradiation of heat from said ceiling into said reaction chamber.

9. Apparatus according to claim 8 in which the said vessel is cylindrical and a cylindrical partition of substantially smaller diameter than said vessel is disposed substantially coaxially within said vessel to provide a cylindrical combustion cylinder and annular reaction chamber.

10. Apparatus according to claim 8 in which said ceiling of the vessel comprises means adapted to absorb heat by direct radiation from said combustion zone and reradiate heat directly onto said bed of solids.

11. Apparatus according to claim 8 in which said support means is a substantially horizontal perforate member.

References Cited by the Examiner
UNITED STATES PATENTS

| | | | |
|---|---|---|---|
| 986,495 | 3/11 | Nix | 48—206 |
| 1,225,263 | 5/17 | Messerschmitt | 23—281 |
| 2,582,710 | 1/52 | Martin | 48—206 |
| 2,657,116 | 10/53 | Daniels | 23—277 X |

MORRIS O. WOLK, *Primary Examiner.*

DELBERT E. GANTZ, *Examiner.*

UNITED STATES PATENT OFFICE
CERTIFICATE OF CORRECTION

Patent No. 3,197,293              July 27, 1965

Eric V. Bergstrom

It is hereby certified that error appears in the above numbered patent requiring correction and that the said Letters Patent should read as corrected below.

Column 2, line 35, strike out "means"; column 4, line 11, for "eac." read -- etc. --; line 24, before "onto" insert -- butane --; line 29, for "synthetic" read -- synthesis --.

Signed and sealed this 8th day of February 1966.

(SEAL)
Attest:

ERNEST W. SWIDER                        EDWARD J. BRENNER
Attesting Officer                              Commissioner of Patents